US009483816B2

United States Patent
Smith et al.

(10) Patent No.: US 9,483,816 B2
(45) Date of Patent: Nov. 1, 2016

(54) METHOD AND SYSTEM FOR HIGH ACCURACY AND RELIABILITY REGISTRATION OF MULTI MODAL IMAGERY

(71) Applicant: Litel Instruments, San Diego, CA (US)

(72) Inventors: Adlai H. Smith, Escondido, CA (US); Robert O. Hunter, Jr., Snowmass Village, CO (US)

(73) Assignee: Litel Instruments, San Diego, CA (US)

( * ) Notice: Subject to any disclaimer, the term of this patent is extended or adjusted under 35 U.S.C. 154(b) by 293 days.

(21) Appl. No.: 14/475,102

(22) Filed: Sep. 2, 2014

(65) Prior Publication Data
US 2015/0324989 A1    Nov. 12, 2015

Related U.S. Application Data

(60) Provisional application No. 61/873,016, filed on Sep. 3, 2013.

(51) Int. Cl.
*G06K 9/32* (2006.01)
*G06T 7/00* (2006.01)

(52) U.S. Cl.
CPC ............ *G06T 7/00* (2013.01); *G06T 7/0026* (2013.01); *G06T 7/0034* (2013.01); *G06T 7/0044* (2013.01); *G06T 7/0081* (2013.01); *G06T 2207/10044* (2013.01); *G06T 2207/20076* (2013.01); *G06T 2207/20212* (2013.01)

(58) Field of Classification Search
None
See application file for complete search history.

(56) References Cited

U.S. PATENT DOCUMENTS

| | | | |
|---|---|---|---|
| 5,828,793 A * | 10/1998 | Mann | G06T 5/007 348/222.1 |
| 6,141,433 A * | 10/2000 | Moed | G01S 3/7865 348/143 |
| 6,654,690 B2 | 11/2003 | Rahmes et al. | |
| 6,707,464 B2 | 3/2004 | Ham et al. | |
| 6,900,760 B2 | 5/2005 | Groves | |
| 6,937,349 B2 | 8/2005 | Jones et al. | |
| 7,248,964 B2 | 7/2007 | Bye | |
| 7,408,629 B2 | 8/2008 | Qwarfort et al. | |
| 7,643,939 B2 | 1/2010 | Zeng et al. | |
| 7,873,472 B2 | 1/2011 | Zeng et al. | |
| 7,885,480 B2 | 2/2011 | Bryll et al. | |
| 7,890,260 B2 | 2/2011 | Ring | |
| 7,974,460 B2 | 7/2011 | Elgersma | |
| 8,024,119 B2 | 9/2011 | Zeng et al. | |

(Continued)

OTHER PUBLICATIONS

U.S. Appl. No. 13/443,684, filed Apr. 10, 2012, Hunter et al.

(Continued)

*Primary Examiner* — Eueng-Nan Yeh
(74) *Attorney, Agent, or Firm* — Foley & Lardner LLP

(57) ABSTRACT

A method for mapping a target image to a reference image includes receiving a target image; receiving a reference image that overlaps the target image; preprocessing the target image, wherein the preprocessing includes: rejecting a target image with a shadow region above a shadow threshold while keeping a target image with a shadow region below a shadow threshold; providing an uncertainty in a location of the kept target image relative to the reference image; transforming the kept target image to an atlas projection to match the reference image; partitioning the transformed kept target image into a sub-region; and determining a matching statistic for each sub-region to determine a location for each sub-region relative to the reference image.

19 Claims, 10 Drawing Sheets

(56) References Cited

U.S. PATENT DOCUMENTS

| | | | |
|---|---|---|---|
| 2006/0215935 A1* | 9/2006 | Oldroyd | G01C 11/00 382/294 |
| 2007/0096979 A1 | 5/2007 | Hinnant et al. | |

OTHER PUBLICATIONS

U.S. Appl. No. 61/644,255, filed May 8, 2012, Hunter, Jr. et al.
Brewin, LightSquared Cellular Network Interferes With All GPS Applications, Latest Tests Show, Jun. 10, 2011, printed from Internet address: http://www.nextgov.com/nextgov/ng_20110610_6517.php on Oct. 25, 2011, 3 pgs.
Chave, A Lightweight Low-Power Magnetometer-Based UAV Flight Control System, ELEC 480, dated Nov. 3, 2005, 70 pgs.
Cramer, GPS/INS Integration, Photogrammetric Week '97, pp. 1-10, (published before this application Sep. 2013).
Dickey-John Corporation, Radar III Ground Speed Sensor (2005), 2 pgs, (published before this application Sep. 2013).
Easley et al., Geometric Transforms and Their Applications to SAR Speckle Reduction, Algorithms for Synthetic Aperture Radar Imagery, Proceedings of SPIE vol. 5095 (2003), pp. 110-118.
Fjortoft et al., Optimal Edge Detection and Edge Localization in Complex SAR Images with Correlated Speckle, IEEE Transactions on Geoscience and Remote Sensing, vol. 37, No. 5, Sep. 1999, pp. 2272-2281.
Frost et al., A Model for Radar Images and Its Application to Adaptive Digital Filtering of Multiplicative Noise, IEEE Transactions on Pattern Analysis and Machine Intelligence, vol. PAMI-4, No. 2, Mar. 1982, pp. 157-166.
Hong et al., A Robust Technique for Precise Registration of Radar and Optical Satellite Images, Photogrammetric Engineering & Remote Sensing, vol. 71, No. 5, May 2005, pp. 585-593.
Hong, Image Fusion, Image Registration, and Radiometric Normalization for High Resolution Image Processing, Geodesy and Geomatics Engineering UNB, Technical Report No. 247, Apr. 2007, 218 pgs.
Huang et al., Feature-Based Image Registration Using the Shape Context, International Journal of Remote Sensing, 2010, 8 pgs, (published before this application Sep. 2013).
Iran Hijacked US Drone, Says Iranian Engineer, The Christian Science Monitor, printed from Internet address: http://www.csmonitor.com/World/Middle-East/2011/1215/Exclusive-Iran_hijacked_US-drone-sa on Dec. 21, 2011, 5 pgs.
Kopp, Almaz S-300—China's "Offensive" Air Defense, printed from Internet address: http://www.strategycenter.net/research/pubID.93/pub_detail.asp on Jul. 25, 2012, 13 pgs.
Kopp, Self Propelled Air Defence System SA-11/17, Technical Report APA-TR-2009-0706, Jul. 2009, printed from Internet address: http://www.ausairpower.net/APA-9K37-Buk.html on Jul. 25, 2012, 50 pgs.
Kostelec et al., Image Registration for MRI, Modern Signal Processing, MSRI Publications, vol. 46, 2003, pp. 161-184, (published before this application Sep. 2013).
Li et al., Contour-Based Multisensor Image Registration, 1992 IEEE, pp. 182-186, (published before this application Sep. 2013).
Lopes et al., Adaptive Speckle Filters and Scene Heterogeneity, IEEE Transactions on Geoscience and Remote Sensing, vol. 28, No. 6, Nov. 1990, pp. 992-1000.
Maurer et al., Synthetic Aperture Radar/Landsat MSS Image Registration, NASA Reference Publication 1039, Jun. 1979, 237 pgs.
McGuire, An Image Registration Technique for Recovering Rotation, Scale and Translation Parameters, Mar. 25, 1998, pp. 1-46.
Merlin et al., Using Layovers in Fusion of Optical and SAR Data Application to Mustang Landscape Analysis, Proceedings of the CEOS SAR Workshop, Toulouse, Oct. 26-29, 1999, pp. 503-507.
Ndili et al., Coding Theoretic Approach to SAR Image Segmentation, Algorithms for Synthetic Aperture Radar Imagery VIII, Proceedings of SPIE vol. 4382 (2001), pp. 103-111, (published before this application Sep. 2013).
O'Connor, Soviet/Russian SAM Site Configuration, Technical Report APA-TR-2009-1205-B, Jan. 2010, printed from Internet address: http://www.ausairpower.net/APA-Rus-SAM-Site-Configs-B.html on Jul. 25, 2012, 27 pgs.
Parekh, Design, Implementation and Performance Evaluation of Synthetic Aperture Radar Signal Processor on FPGAs, Masters Thesis, Jun. 23, 2000, 35 pgs.
Pluim et al., Mutual Information Based Registration of Medical Images: A Survey, IEEE Transactions on Medical Imaging, vol. XX, No. Y, 2003, pp. 1-21, (published before this application Sep. 2013).
Poulain et al., High-Resolution Optical and SAR Image Fusion for Building Database Updating, IEEE Transactions on Geoscience and Remote Sensing, vol. 49, No. 8, Aug. 2011, pp. 2900-2910.
Rawnsley, North Korean Jammer Forces Down U.S. Spy Plane, printed from Internet address: http://www.wired.com/dangerroom/2011/09/north-korean-jammer-forces-down-u-s-spy-p on Oct. 25, 2011, 3 pgs.
Reinartz et al., Orthorectification of VHR Optical Satellite Data Exploiting the Geometric Accuracy of TerraSAR-X Data, ISPRS Journal of Photogrammetry and Remote Sensing 66 (2011), pp. 124-132, (published before this application Sep. 2013).
Roche et al., The Correlation Ratio as a New Similarity Measure for Multimodal Image Registration, 1998 Springer Verlag, Proceedings MICCAI'98, vol. 1496 of LNCS, 1115-1124, 10 pgs, (published before this application Sep. 2013).
Shu et al., SAR and Spot Image Registration Based on Mutual Information with Contrast Measure, IEEE 2007, pp. 429-432, (published before this application Sep. 2013).
Sijs et al., Optimal Decentralized Kalman Filter, 17th Mediterranean Conference on Control & Automation, Jun. 24-26, 2009, pp. 803-808.
Subrahmanyam et al., Edge-Preserving Unscented Kalman Filter for Speckle Reduction, 2008 IEEE, 4 pgs, (published before this application Sep. 2013).
TGSS True Ground Speed Sensor 740, User Manual HY33-5005-IB/US, Ed. Jan. 2012, 23 pgs.
Vassilaki et al., Geospatial Data Integration Using Automatic Global Matching of Free-Form Curves, ISDE 2008, Digital Earth Summit on Geoinformatics, Potsdam, Germany, Nov. 12-14, 2008, 24 pgs.
Wegner, Automatic Fusion of SAR and Optical Imagery, Sep. 2007, 117 pgs.
Winn, North Korea's GPS Jammer Brigade, Sep. 16, 2011, printed from Internet address: http:/www.globalpost.com/dispatch/news/regions/asia-pacific/110916/north-korea%E2% on Oct. 25, 2011, 3 pgs.
Wong et al., AISIR: Automated Inter-Sensor/Inter-Band Satellite Image Registration Using Robust Complex Wavelet Feature Representations, Pattern Recognition Lett. (2009), doi:10.1016/j.patrec.2009.05.16., 8 pgs.
Yousif, Multitemporal Spaceborne SAR and Fusions of SAR and Optical Data for Unsupervised Change Detection in Shanghai, Master's of Science Thesis in Geoinformatics, Dec. 2009, 117 pgs.
Zhang et al., Bayesian-Based Speckle Supression for SAR Image Using Contourlet Transform, Journal of Electronic Science and Technology of China, vol. 6, No. 1, Mar. 2008, pp. 79-82.
Zitova et al., Image Registration Methods: A Survey, Jun. 26, 2003, 24 pgs.
Averbuch et al., Image Registration Using Implicit Similarity and Pixel Migration, 2006, pp. 1-14, (published before this application Sep. 2014).
Barbour et al., Inertial Instruments: Where to Now?, In Proceedings of the AIAA Guidance and Control Conference, Aug. 1992, pp. 566-574.
Bunting et al., An Area Based Technique for Image-To-Image Registration of Multi-Modal Remote Sensing Data, Conference: Geoscience and Remote Sensing Symposium, Aug. 2008, 2 pgs.
DeBonet et al., Structure-Driven SAR Image Registration, Proceedings of SPIE, Conference vol. 3370, Sep. 1998, 11 pgs.
GENS, Terrain Correction and Ortho-Rectification, 2005, pp. 1-11, (published before this application Sep. 2014).

(56) References Cited

OTHER PUBLICATIONS

Glasbey, C., SAR Image Registration and Segmentation Using an Estimated DEM, Proceedings of International Workshop EMMCVPR'97, May 21-23, 1997, in Energy Minimization Methods in Computer Vision and Pattern Recognition, Lecture Notes in Computer Science, 1223, Springer, Berlin, 507-520, 1997, 14 pgs.
Goncalves et al., Precise Orientation of Spot Panchromatic Images with Tie Points to a SAR Image, ISPRS Commission III, Symposium 2002, Photogrammetric Computer Vision PCV'02, Sep. 9-13, 2002, ISPRS Archives of Photogrammetry Remote Sensing and Spatial Information Sciences, vol. 34, 2002, 6 pgs.
GPS Jamming, No Jam Tomorrow, The Economist, Mar. 10, 2011, printed from Internet address: http://www.economist.com/node/18304246 on Oct. 25, 2011, 4 pgs.
Hellwich et al., Sensor and Data Fusion Contest: Test Imagery to Compare and Combine Airborne SAR and Optical Sensors for Mapping, ISPRS Commission III, Symposium 2002, Photogrammetric Computer Vision PCV'02, Sep. 9-13, 2002, ISPRS Archives of Photogrammetry Remote Sensing and Spatial Information Sciences, vol. 34, 2002, 4 pgs.
Jia et al., SAR Image and Optical Image Registration Based on Contour and Similarity Measures, Proc. GSEM, Sep. 14-16, 2009, pp. 341-345.
Kang et al., Automatic SAR Image Registration by Using Element Triangle Invariants, 9th International Conference on Information Fusion, Jul. 10-13, 2006, IEEE, 7 pgs.
Lehureau et al., Registration of Metric Resolution SAR and Optical Images in Urban Areas, 7th European Conference on Synthetic Aperture Radar (EUSAR), Jun. 2-5, 2008, 4 pgs.
Li et al., Registration of Radar and Optical Satellite Images Using Multiscale Filter Technique and Information Measure, Geoscience and Remote Sensing, New Achievements, Chapter 24, Feb. 1, 2010, pp. 457-476.
Olfati-Saber, Distributed Kalman Filtering and Sensor Fusion in Sensor Networks, Network Embedded Sensing and Control, Lecture Notes in Control and Information Science, vol. 331, Jul. 2006, pp. 1-13.
Suri et al., Application of Generalized Partial Volume Estimation for Mutual Information based Registration of High Resolution SAR and Optical Imagery, 11th International Conference on Information Fusion, Jun. 30-Jul. 3, 2008, IEEE, pp. 1257-1264.
Suri et al., Combining Mutual Information and Scale Invariant Feature Transform for Fast and Robust Multisensor SAR Image Registration, 75th Annual ASPRS Conference, Mar. 5, 2009, American Society of Photogrammetry and Remote Sensing, 12 pgs.
Suri et al., On the Possibility of Intensity Based Registration for Metric Resolution SAR and Optical Imagery, Proceedings of 12th Agile International Conference on Geographic Information Science, Jun. 2-5, 2009, 19 pgs.
Wegner et al., Image Analysis of Fused SAR and Optical Images Deploying Open Source Software Library OTB, ISPRS Archives, vol. 36, ISPRS Hannover Workshop, May 29-Jun. 1, 2007, 5 pgs.
Wegner, Automatic Fusion of SAR and Optical Imagery based on Line Features, 7th European Conference on Synthetic Aperture Radar (EUSAR), Jun. 2-5, 2008, 4 pgs.
Wessel et al., Registration of Near Real-Time SAR Images by Image-To-Image Matching, International Archives of Photogrammetry, Remote Sensing and Spatial Information Sciences, 36, Photogrammetric Image Analysis, Sep. 19-21, 2007, pp. 179-184.

\* cited by examiner

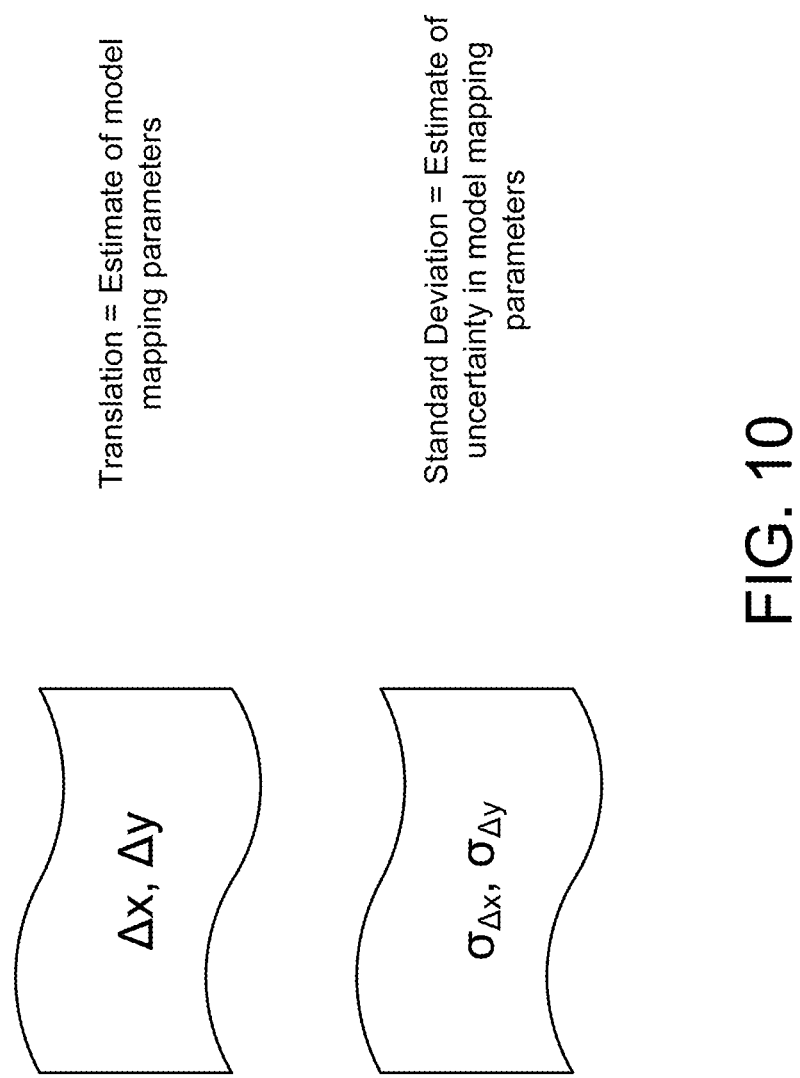

METHOD AND SYSTEM FOR HIGH ACCURACY AND RELIABILITY REGISTRATION OF MULTI MODAL IMAGERY

CROSS-REFERENCE TO RELATED APPLICATIONS

This application claims the benefit of priority of U.S. Provisional Patent Application No. 61/873,016, filed Sep. 3, 2013, entitled "METHOD & SYSTEM FOR HIGH ACCURACY & RELIABILITY REGISTRATION OF MULTI MODAL IMAGERY," which is incorporated herein by reference in its entirety.

TECHNICAL FIELD

The present disclosure generally relates to methods for accurately and reliably registering two or more images acquired using different physical means or modalities. The main examples provided herein emphasize registering synthetic aperture radar images to optical or infrared imagery. Automatic and reliable adjustment of images that have higher order (beyond translation) image distortion is another exemplary aspect of the present disclosure.

BACKGROUND

Image registration is the process of aligning two or more images so they accurately coincide with one another. It is routinely required for purposes of aerial identification and targeting, medical diagnosis and treatment, and geophysical studies. The registration of images of the same object obtained using different techniques (e.g., radar, optical, laser illuminated, magnetic resonance imaging (MRI), x-ray, etc.) is generally very difficult because it is not generally tractable. This multimodal registration is even more difficult if the initial uncertainty window in registration is large enough that a direct correlation coefficient calculation encounters numerous false maxima over said window. Numerous $R^2$ maxima in the uncertainty window can be handled by some methods, but if the highest $R^2$ maxima does not correspond to the correct image registration, then resulting images are likely to be misaligned. In situations where there is human oversight, this can be rectified, but in time constrained circumstances (i.e., not an automatic process). Further, image misregistration leads directly to munition mistargeting with destructive consequences. Synthetic aperture radar (SAR) imagery is notable for its wide dynamic range (typically 16 bits) and strong coherence effects (esp. speckling) while optical imagery (as photographed in natural light) has lower dynamic range (typically 8 bits) but more channels (RGB) and an absence of coherent effects. Additional differences are scattering and reflectivity responses of the physical objects in the imaged scenes at different wavelengths ($\lambda$=3 cm/0.00005 cm at radar/optical) and the distinctly different location of shadows (they are the same only if the optical images are acquired with the imaging platform directly between the illumination source (sun) and the scene). This difference and variety in response characteristics can manifest itself as a mapping or correspondence between the SAR and optical signals that depends strongly on position within an imaged scene.

One class of approaches to SAR/optical registration identifies distinct features or control points in each image, matches or corresponds these features one to another, and then aligns the images based on these matched features. Feature based imaging techniques are difficult because of multiplicative SAR speckle and the general lack of a uniform correspondence between optical and radar features. Exactly how these features are chosen is typically algorithm-dependent and said features sometimes go by the name of bandlets, beamlets, wavelets, and tip points. These features are chosen manually or automatically and are supposed to be salient and distinctive objects shared by both images (target and reference). Their density and location is entirely image dependent.

Another class of approaches utilizes edges or more generally contours or contourlets, curvelets, ridgelets as the matching features. Because of coherence effects (corner and edge reflections), some contours in SAR can be over prominent (bright lines or streaks) relative to optical imagery. Strong speckling effects leads to additional contours without corresponding optical contours. Overall, this results in extraneous SAR edges which must be pruned prior to feature matching. Typical of these approaches is the suppression of SAR speckle using adaptive spatial moving averages which in the case of a single image always leads to a reduction in image resolution.

For registration of imagery not displaced by much, the above algorithms may be suitable but what is lacking is a robust method for registering images with large uncertainty windows.

SUMMARY

One embodiment relates to non-transitory computer-readable storage medium having machine instructions stored therein, the instructions being executable by a processor to cause the processor to perform operations including: receiving a target image; receiving a reference image that overlaps the target image; preprocessing the target image, wherein the preprocessing includes: rejecting a target image with a shadow region above a shadow threshold while keeping a target image with a shadow region below the shadow threshold; providing an uncertainty in a location of the kept target image relative to the reference image; transforming the kept target image into an atlas projection to match the reference image; partitioning the transformed kept target image into a sub-region; and determining a matching statistic for each sub-region to determine a location for each sub-region relative to the reference image.

Another embodiment relates to an image processing system including an image acquisition device configured to acquire a reference image and a target image and a processor. The a processor structured to pre-process the target image, wherein the pre-processing of the target image includes: receive the target image; reject a target image with a shadow region above a shadow threshold while keeping a target image with a shadow region below the shadow threshold; providing a model for mapping between the target image and the reference image; transforming the kept target image into an atlas projection to match the reference image; partitioning the kept target image into sub-regions; and determining a fractional area of each sub-region that is shadowed. The processor is further structured to pre-process the reference image, wherein the pre-processing of the reference image includes: receiving the reference image; providing a digital elevation map (DEM) of the reference image; projecting the reference image onto a target slant plane, wherein the projection includes a shadow region; and interpolating the projected reference image to match orientation and pixel spacing of the target image. The processor is structured to determine a matching statistic for each target image sub-region to determine a location for each sub-region relative to the reference image Yet another embodiment relates to a method of mapping a synthetic aperture radar (SAR) image to a reference image, the method including: pre-processing, by a processor, a target image including: rejecting a target image with a shadow region above a shadow threshold while keeping a target image with a shadow region below a shadow threshold; partitioning the transformed kept target image into a sub-region; and determining a fractional area of the kept target sub-region that is shadowed. The method also includes pre-processing, by the processor, a reference image including: projecting the reference image onto a target slant plane, wherein the projection includes a shadow region; and determining a fraction area of the reference image that is shadowed. The method further includes determining, by the processor, a matching statistic for each sub-region that includes: selecting a fixed form for the reference image with no free parameters; selecting one or more basis functions to map a target image amplitude for the sub-region to a reference image amplitude; providing an upper limit and tolerance for fractional coverage, and providing an upper limit beyond which a target sub-region is not considered due to having an excessive shadow region; and determining a location and a normalized mean square error (NMSE) for each target sub-region; wherein the determined location of the sub-region corresponds with a shadow content of the sub-region matching a shadow content of the reference image within a specified tolerance.

BRIEF DESCRIPTION OF THE FIGURES

FIG. 10 depicts an estimate of the model mapping parameters and an estimate of their uncertainty from the method of FIG. 1, according to one embodiment.

DETAILED DESCRIPTION

Figure 1:
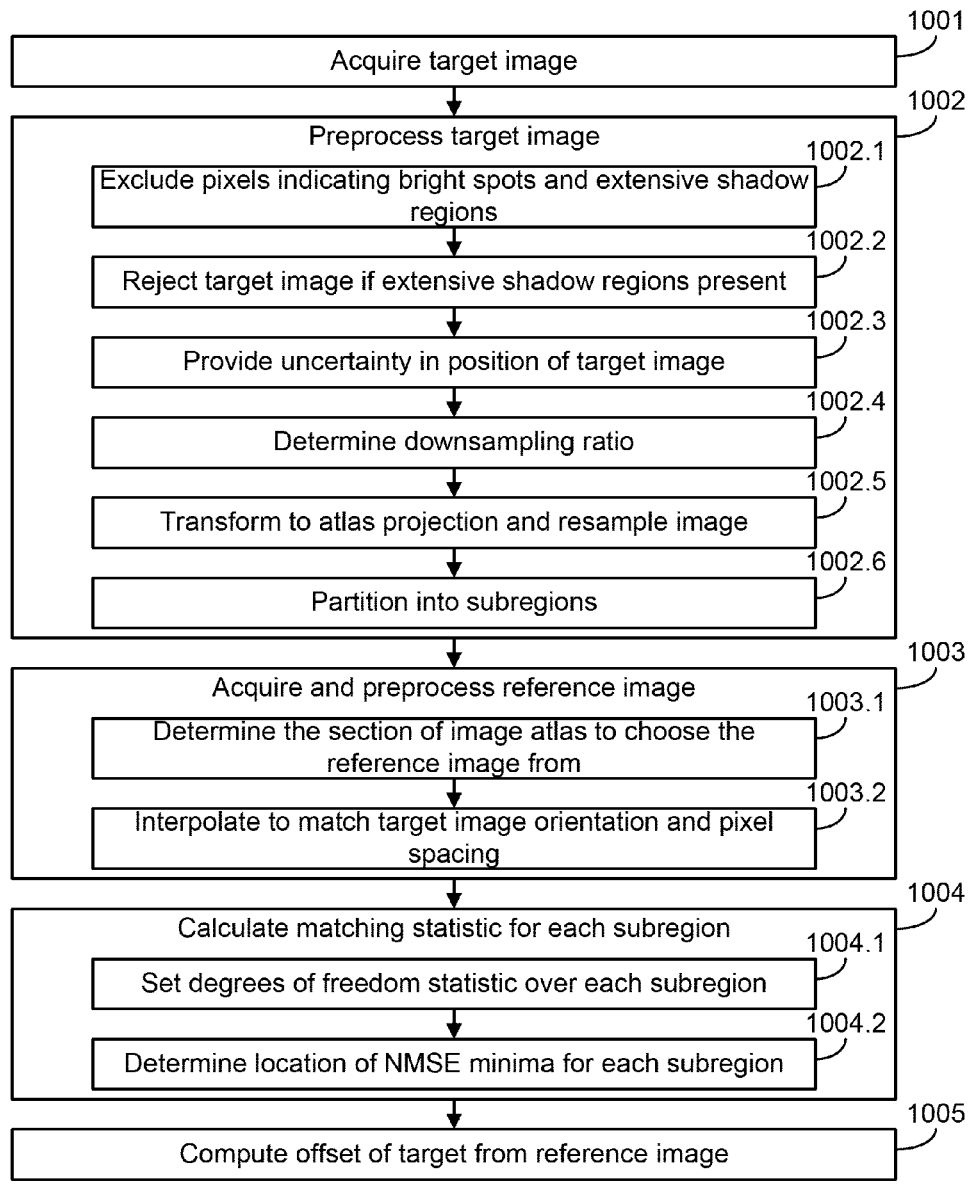
FIG. 1 is a flow diagram of a method of mapping a target image to a reference image, according to one embodiment.

It should be understood that the embodiments disclosed and described herein may be implemented with an image processing system. The image processing system may include an image acquisition device (see, e.g., reference numeral 5004 in FIG. 5) and a processing circuit including a processor(s) structured to perform at least some of the processes described herein. The image acquisition device 5004 (FIG. 6, reference numeral 6004) may be communicably coupled to the processor by any wired or wireless connection. For example, a wired connection may include a serial cable, a fiber optic cable, a CAT5 cable, or any other form of wired connection. In comparison, a wireless connection may include the Internet, Wi-Fi, cellular, radio frequency (RF), etc.

As mentioned above, the processor(s) of the processing circuit may be structured to perform at least some of the processes described herein in regard to the various disclosed embodiments. The processor(s) may be implemented as a general-purpose processor, an application specific integrated circuit (ASIC), one or more field programmable gate arrays (FPGAs), a digital signal processor (DSP), a group of processing components, or other suitable electronic processing components. The processor may include one or more memory devices including non-tangible machine readable instructions for performing the operations described herein. Exemplary non-tangible machine readable instructions are described more fully herein. Thus, while the processor is not always mentioned in regard to certain embodiment(s) described herein, it should be understood that at least portions of the method, apparatus, and/or embodiment(s) of the present disclosure may be implemented with a processor as described above and further herein.

According to some embodiments, processes for robustly registering SAR imagery with large uncertainty windows in an optical image are provided. According to some embodiments, methods for robust registration of multimodal imagery for large and small displacements are provided. According to some embodiments, robust methods for registering multimodal imagery which is distorted by translation, rotation, shear and possibly higher order distortions are provided.

First Embodiment

FIG. 1 outlines the first embodiment of mapping a target image to a reference image. It should be understood that while the system and methods described herein are in primarily in regard to synthetic aperture radar (SAR) imaging, other imaging systems may also be utilized such that the present disclosure is not intended to be limiting towards SAR imaging, such that other imaging systems and methods are meant to fall within the spirit and scope of the present disclosure.

Acquire Target Image

Figure 5:
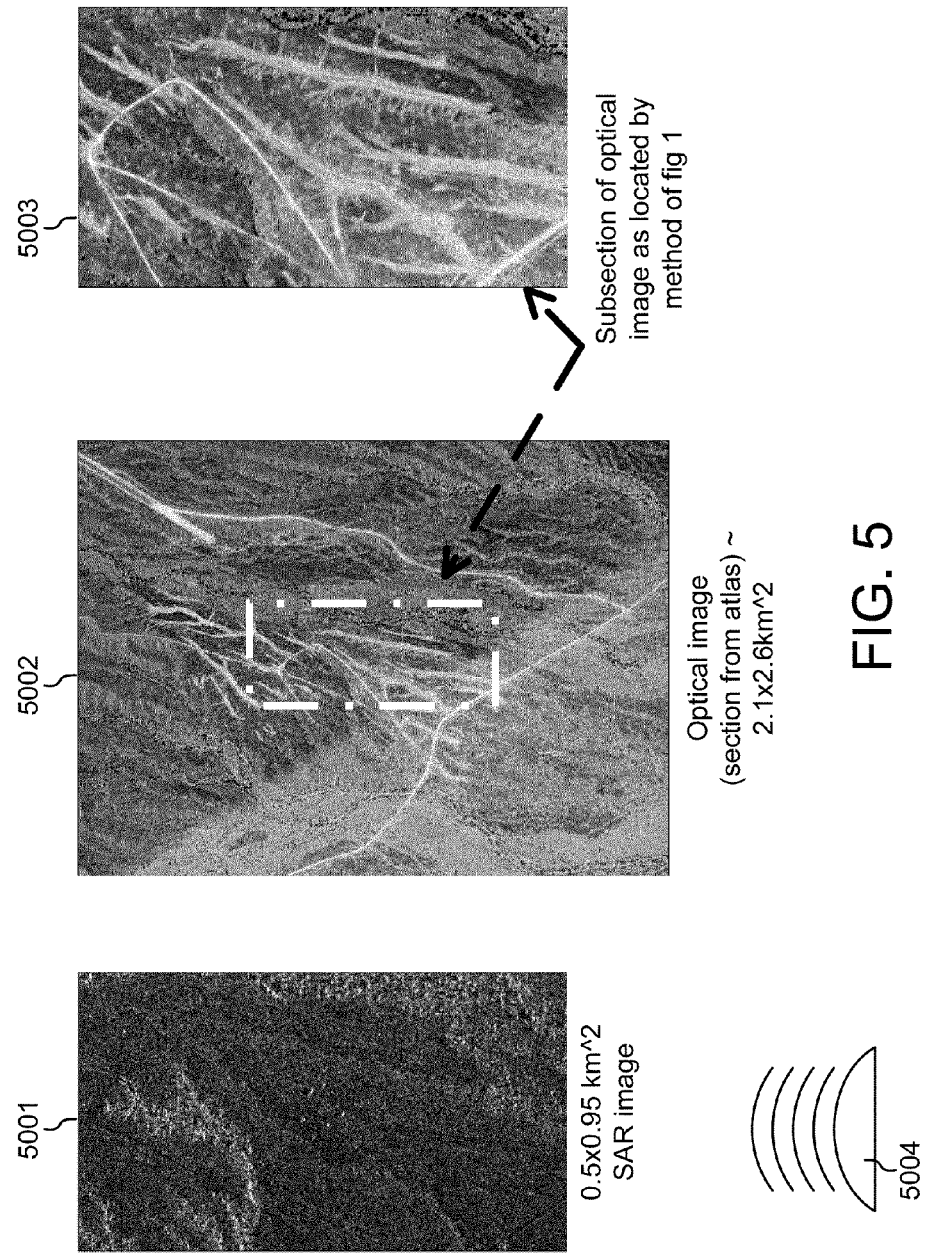
FIG. 5 is an example result of the method of FIG. 1, according to one embodiment.
Figure 6:
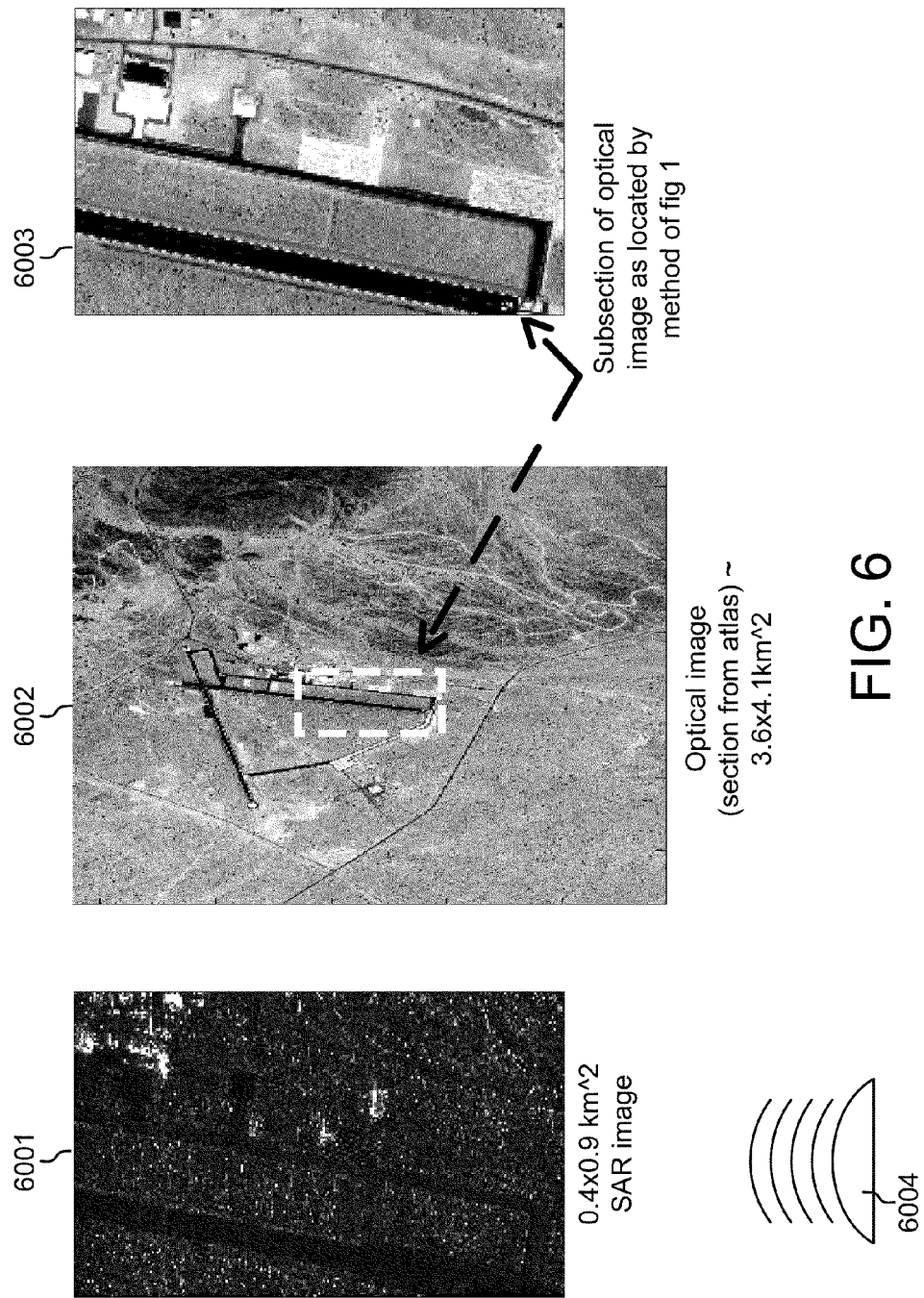
FIG. 6 is another example result of the method of FIG. 1, according to one embodiment.

Referring still to FIG. 1, at block 1001 the SAR image (target image) is typically acquired by an aerial platform (usually unmanned) or a satellite (see, e.g., reference numeral 5004 in FIGS. 5 and 6004 in FIG. 6). The acquisition method (spotlight or scan mode) determines the specific type of distortion present in the raw cross range by range data set that constitutes the image. Image size and resolution depends strongly on the radar band (Ka, Ku, X, C, etc.), standoff distance, and imaging mode. Technology generation for unmanned aerial vehicles generally covers an area of approximately 1-3 km^2. The data presents itself as an ncr (number of pixels in the cross range)×nr (number of pixels in-range) pixel^2 rectangular array of amplitudes (at (icr=1:ncr, ir=1:nr)) with icr, it denoting the cross range, range directions and associated metadata providing the nominal geographic location (latitude, longitude), image orientation, and other data acquisition parameters. Return amplitude A may be real or complex and may also be the result of a polarized transmitter and receiver.

Pre-Process Target Image

At process 1002, FIG. 1 includes the steps for preprocessing the target image before it is attempted to be located relative to the reference image. As used herein, the phrase reference image is used interchangeably with atlas image. As also used herein, the phrases reference image or atlas image refers to a specific image with which the target image is desired to be or chosen to be aligned with. For example, a global atlas may supply the atlas or reference. Accordingly, referring back to FIG. 1, first, in box 1002.1, the statistics of the amplitude magnitude |At(icr,ir)| are used to determine which pixels are kept. Pixels indicating bright spots are excluded. If the reference image is also SAR, the target image amplitude, |At|, is typically used without change while for an optical reference image, censoring is generally required. Utilizing the amplitude image permits identification of shadowed pixels and bright pixels. In turn, exclusion of these pixels (in some embodiments, regions) is achieved. For 16 bit SAR imagery, the statistics of |At| are typically almost bimodal with the great bulk (greater than approximately 98%) of the pixels having amplitudes equal to: <4-8×median(|At|)<<max(|At|)=2^16−1. A 0 weight is assigned to pixels with values greater than some multiple (Xmed approximately equal to 4-8) of the median target pixel value (median(|At|) and 1 to the remaining, lower valued pixels (net result is an array iont(icr,ir)=1/0 depending on whether the resulting pixel is kept/discarded in subsequent calculations). Still within step 1002.1 of FIG. 1, another aspect of SAR imagery, especially noticeable in mountainous or otherwise sharply undulating (possibly urban areas) terrain, are shadow regions. At process 1002.2, a target image with a shadow region above a shadow threshold is rejected while target images with shadow regions below the shadow threshold are kept. The shadow threshold refers to a permissible shadow area per target image. In one embodiment, the shadow threshold is a detector noise level. Target images with shadow areas above the detector noise level are discarded while target images with shadow areas below the detector noise level are kept. The method of FIG. 1 is substantially not concerned with relatively small scale shadowing such as produced by brush, boulders, trees, or from vehicles, power or utility lines, grounded aircraft, or isolated groups of buildings but is concerned with shadowing created by larger features such as hills, ravines, mountains and canyons. Depending on the radar illumination geometry, there can be large (greater than approximately 5% of acquired image area), contiguous areas that are shadowed and consequent low amplitudes (at electronics and signal processing noise levels plus atmospheric haze return levels). This background noise level is readily measured by looking at returns from an upwardly (or at least looking away from the ground) aimed SAR, processing said data to an image and noting the spatial and amplitude statistics of |At|. From these air image statistics, adjusted for any system auto gain, determinations of which regions of the target image are shadowed can be readily made. Failing this rather simple and dependable technique, an alternative is to estimate from the target image amplitude (|At|) the location of shadow regions. The present example method is interested in large (greater than approximately 5%) contiguous shadows, such that a moving average with window sizes containing a significant number of pixels for reducing fluctuations (<½-1% or area) to detect big connected areas that are candidate shadow regions and then compare the amplitude statistics within these candidate regions for statistical equality and being statistically below the clutter or feature level may be utilized. So, based on this analysis, computation of a shadowing array, isht(icr,ir)=0/1 depending on whether a pixel is within a shadow/or not is achieved.

Having categorized target pixels into those considered and not (iont) and whether they are in the shadow or not (isht) (in some embodiments, in a bright spot and excluded or not), the method of FIG. 1 progresses move to box 1002.2. Since shadows in the reference image are far less contrasting than SAR shadows (diffusely illuminated by skylight versus direct sunlight) and are generally illuminated and observed with a completely different geometry, the presence of large, contiguous SAR shadows (greater than approximately 50-75% of the area) proportionately reduces the amount of information in the target image to the point where it is no longer feasible to attempt matching it with an optical image. If this determination is so made, the process is stopped at this point since continuing significantly increases the probability of incorrect registration. If this determination is not so made, the process can continue. Accordingly, the shadowing array is combined with the on/off array so that pixels in shadow regions are not considered in the subsequent registration process (mathematically, iont(icr,ir)−>iont(icr,ir)*isht(icr,ir)).

Next (substep 1002.3), an estimate of the uncertainty in the location (Δ) of the target image relative to the reference is made. For the coarse location problem (which is more difficult than the fine location one) errors on the order of several meters (less than approximately 10 m) are inconsequential; typically, there are uncertainties of tens of meters to several kilometers (and possibly more). At these sorts of scales, the uncertainty in reference image location relative to its data base is typically small but can be added in to the uncertainty in target image location. The natural source for estimating target image location error is the target image acquiring platform (say unmanned aerial vehicle or UAV) inertial navigation system's characteristic drift since the last reliable GPS positional update or the last reliable navigational waypoint update. This drift as a function of time is a well characterized aspect of UAV's or any other platform utilizing inertial navigation.

With the uncertainty (Δ) and size of the target image size (wxt×wyt) in hand, down sampling (process 1002.4) of the target and reference images may be performed. This is typically a reduction in the pixel spacing by a factor (ds) of 2 or more (number of image points reduced by square of this factor) and can be accomplished by simply keeping only every ds pixel along each direction (ixt, iyt) or locally averaging at these same pixels with a ds×ds sized weighting window. A weighting window may take the form of a flat average or may be tapered (a triangle, Gaussian, Hanning, etc. window). The choice of weighting window is typically different for target and reference images.

Figure 2:
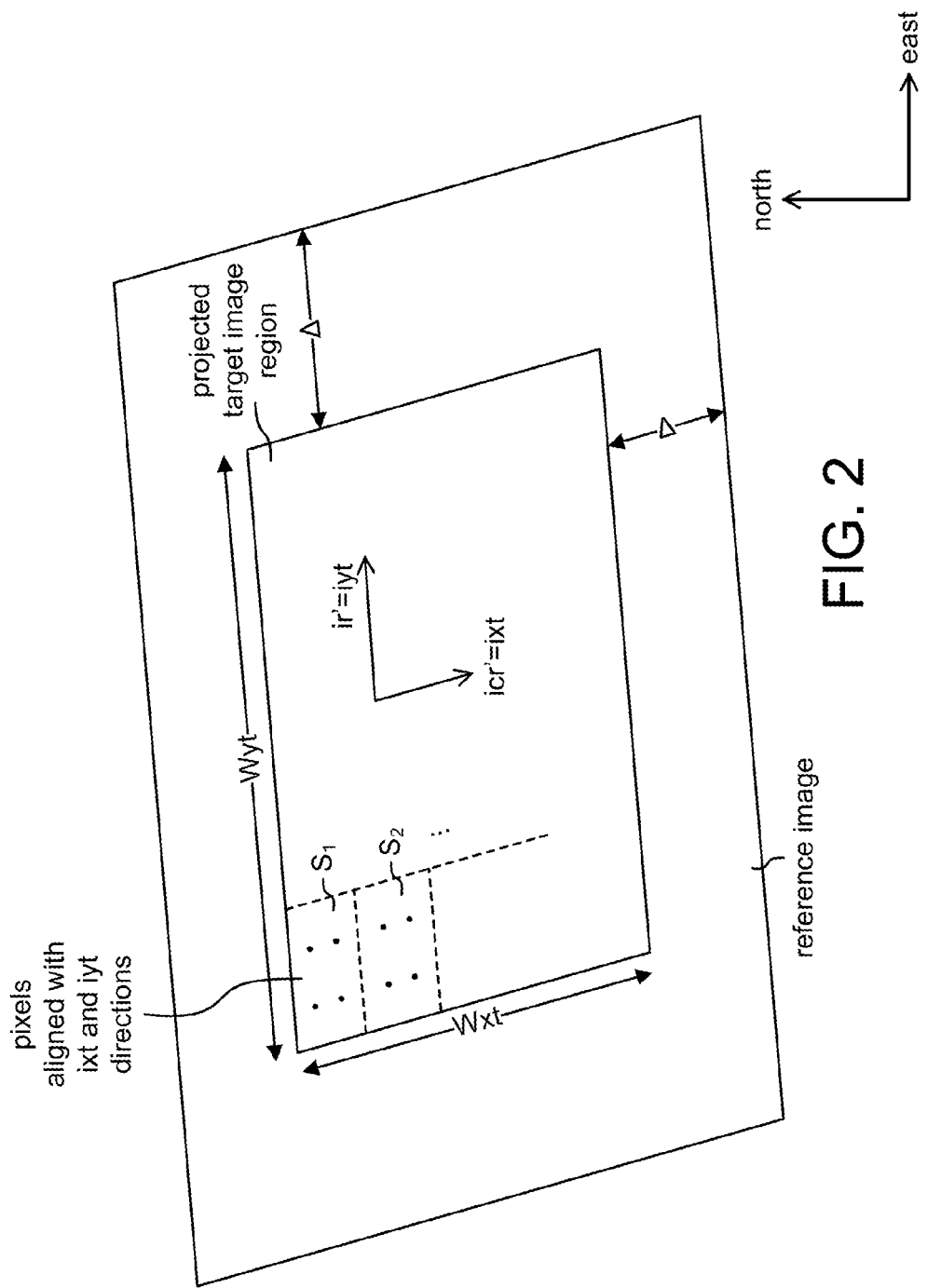
FIG. 2 is a schematic diagram of the space a projected target image occupies on a reference surface and the projected target image's relation to a cardinal direction system, according to one embodiment.

Next, and moving to process 1002.5 in FIG. 1, the target amplitude is transformed or mapped to match the reference image projection. SAR imagery is naturally acquired in the slant plane which is a certain geometric projection of the terrain set by the imaging acquisition platform geometry; hence the reference to cross range and range coordinates (in pixels, this is represented by the nr×ncr notation above). The reference or atlas imagery may be pixelated in latitude, longitude or possibly flat earth (local tangent plane to earth) coordinates. In any event, the |At|(icr,ir) is now projected and interpolated to the same planar or spherical reference surface the reference image resides in. To preserve as much information as possible, the following may occur: 1) when no down sampling (ds=1) is required, the nearest neighbor interpolation is used to preserve sharp gradients in the SAR data; 2) the cross range (icr) and range (ir) directions are appropriately transformed and maintained as the new principal directions (icr'=ixt, ir'=iyt) with the resultant transformed target image being a rectangular image with pixel rows and columns aligned with the edges of the projected target image. FIG. 2 illustrates an example of the region such a projected target image occupies on the reference surface and it's relation to a standard north, east coordinate system. The result is a transformed, interpolated, and possibly down sampled amplitude (|At'(ixt,iyt)|=|At(ixt,iyt)| in the foregoing). In transforming the on/off array (iont), the same process is substantially followed except when down sampling involves local averaging, a threshold value ion_th for the weighted sum ($\Sigma[\Delta icr,\Delta ir]wt(\Delta icr,\Delta ir)*iont(icr+\Delta icr,ir+\Delta ir)$, $\Delta icr$, $\Delta ic$ vary and summed over dsxds sized pixel window) sets the result (iont')=0/1 for values </> ion_th. Hereafter, iont'(ixt,iyt) is denoted as iont(ixt,iyt).

Moving to the next step (1002.6 of FIG. 1), the target amplitude is partitioned into sub regions (S1, . . . Snsr). These (typically exclusive) sub regions are typically rectangles with aspect ratios of approximately 1, greater than 10^4 on pixels, greater than 50% on pixels, of total number >10 (typically 50-100 total). It is these sub regions that may be initially located within the reference image. Other techniques based on feature similarity within the target image are possible.

Acquire & Pre Process Reference Image

At process 1003, FIG. 1 includes the steps involved in acquiring and preprocessing the reference image before the reference image is attempted to be registered with the target image.

The combination of the target image size and the provided uncertainty in location allows for determination of the section of the image atlas to choose the reference image from (sub step 1003.1). So, the provided uncertainty $\Delta$ means the reference image should have size (wxt+2*$\Delta$, wyt+2*$\Delta$) in the (ixt,iyt) directions and be centered on the nominal or assumed location of the target image. The image atlas may be an onboard database or, bandwidth allowing, an offline one with the required reference image being provided by a high speed data link. The provided reference image may also have pixels that may not be considered (for instance due to partial cloud coverage) and this would be conveyed in an on/off array similar to that of the target (iont). Note the provided reference array and ionref grid size, spacing and orientation may not match the (possibly resampled) target array. This reference image is now down sampled and interpolated to match the grid spacing and orientation of the preprocessed target image. Again, interpolation may be weighted and ionref is handled similarly to iont (see above). For RGB color images, selection of 1 channel (typically G has best resolution) may be made or use of a weighted average of the three may be done.

Calculate Matching Statistic for Each Sub Region

At process 1004, FIG. 1 includes the sub steps involved in calculating the matching statistic for each sub region. The matching statistic is the metric used to determine alignment of the target sub region within the (oversized) reference region. It may be an information based metric or a more conventional metric like sum squared error (SSE) or normalized mean square error (NMSE). To succeed in reliably finding the location of our target sub region (Sk) within the reference image it may prove vital to adaptively remap the distribution of histogram of |At|. This is to accommodate the unknown and spatially varying correlation of |At| to |Ar|. This is accomplished by choosing a basis set of functions, f1(|At|), f1(|At|), . . . fn(|At|), with coefficients C1, C2, . . . Cn that vary as a function of trial displacement (dx,dy) of Sk from its nominal (=unmoved) position so as to minimize the NMSE. The reference image amplitude is also remapped with a single function g(|Ar|) with no undetermined parameters and the expression for the SSE for sub region Sk becomes:

$$SSEk(dx,dy)=\Sigma_k iont(ixt,iyt)*ionref(ixt+dx,iyt+dy)*(g(|Ar|(ixt+dx,iyt+dy))-gav(dx,dy)-C1*f1(|At|(ixt,iyt))- \ldots Cn*f1(|At|(ixt,iyt)))^2 \quad (eq. 1)$$

Where the summation is taken over points within target sub region Sk, iont and ionref factors substantially only allow 'on' points to contribute, dx and dy both range over the uncertainty in positioning ionref (−$\Delta$:+$\Delta$), gav(dx,dy) is the average of g(|Ar|) as windowed by Sk, centered per (dx,dy), and weighted by ionref, and at this point C1, . . . Cn are determined by minimizing SSEk with respect to these parameters. What results is C1, . . . Cn as functions of the trial displacement (dx, dy). Normalized mean squared error (our metric) for sub region Sk is:

$$NMSEk(dx,dy)=SSEk(dx,dy)/nk(dx,dy)*\sigma_g^2(dx,dy) \quad (eq. 2)$$

where the values C1, . . . Cn are now known as a function of (dx,dy) and $$nk(dx,dy)=\# \text{ of on points used}=\Sigma_k iont(ixt,iyt)*ionref(ixt+dx,iyt+dy) \quad (eq. 3)$$

$$\sigma_g^2(dx,dy)=\Sigma_k iont(ixt,iyt)*ionref(ixt+dx,iyt+dy)*(g(|Ar|(ixt+dx,iyt+dy))-gav(dx,dy))^2/nk(dx,dy) \quad (eq. 4)$$

and $$gav(dx,dy)=\Sigma_k iont(ixt,iyt)*ionref(ixt+dx,iyt+dy)*g(|Ar|(ixt+dx,iyt+dy)) \quad (eq\ 4.1)$$

The offset of sub region Sk is determined by the point (dx=dxk, dy=dyk) that minimizes NMSEk of equation 2. When all of the reference array points are used (ionref=1) an economical way of calculating NMSEk (eq. 2) starts with the inner product:

$$\langle R|T\rangle(dx,dy) = \Sigma_k\ ionref(ixt+dx,iyt+dy)* \quad (eq. 5)$$
$$R(ixt+dx,iyt+dy)*$$
$$iont(ixt,iyt)*T(ixt,iyt)/nk(dx,dy)$$
$$= \Sigma_k R(ixt+dx,iyt+dy)*iont(ixt,iyt)*$$
$$T(ixt,iyt)/nk$$

which is efficiently computed as a convolution, note that when R=1, there is no longer any dependence on (dx,dy) and there is:

$$\langle 1|T\rangle=\Sigma_k iont(ixt,iyt)*T(ixt,iyt)/nk \quad (eq. 6)$$

Next, without any optimization the variance of the reference region within the moving window is $\sigma^2 g(dx,dy)$ as defined in equations 4 and 4.1.

For a single function, f1, the following is formed:

$$E1(|At|(ixt,iyt))=f1(|At|(ixt,iyt))/\text{sqrt}(\langle 1|f1^2\rangle) \quad (eq. 8)$$

and the effect of choosing an optimum C1 is then to produce the mean square error:

$$MSEk(dx,dy)=\sigma^2 g-\langle g(|Ar|)-gav(dx,dy)|E1\rangle^2 \quad (eq. 9)$$

While if there are 2 functions f1, f2 the following is formed:

$$E2(|At|(ixt,iyt))=f2(|At|(ixt,iyt))-<1|f2(|At|(ixt,iyt))*E1(|At|(ixt,iyt))> \quad \text{(eq. 10)}$$

and then normalize E2 as done in E1. Then, the effect of choosing an optimum C1 and C2 it to produce a mean square error:

$$MSEk(dx,dy)=\sigma^2 g-<g(|Ar|)-gav(dx,dy)|E1>^2-<g(|Ar|)-gav(dx,dy)|E1>^2 \quad \text{(eq. 11)}$$

which is just a simple update of (eq. 9). Continuing in this manner, efficient and compact computation of MSEk for the totality (n) of functions f1, . . . fn and arrival at the expression for the normalized mean square error is:

$$NMSEk(dx,dy)=MSEk(dx,dy)/\sigma_g^2(dx,dy) \quad \text{(eq. 12)}$$

from which the location (dxk,dyk) of minimum NMSE may be determined, which corresponds to the best choice for the location of sub region Sk in the reference image. When ionref is not all ones, computation in a systematic manner the NMSEk may still be accomplished, but this additional bookkeeping does not illustrate further aspects of this disclosure.

The choice of functions f1, f2, etc. for the target image should be a minimum of 2 most simply a constant (f1(x)=1) and the amplitude itself (f2(x)=x). Then, tracking of shifts in overall intensity level, scale along with contrast reversal of the target amplitude relative to the reference amplitude may be made. Larger sets of functions such as polynomials of orders 0:n−1 are other possibilities. As for the choice of scaling function (g) for the reference amplitude, the most natural is the amplitude itself (g(x)=x) but modest power scaling's (g(x)=x^a, a~0.4:1.25), or more complex scaling's (g(x)=x^a(b−x)^c) are also reasonable.

The aforementioned description relates to how for a single sub region, Sk, the best estimate of its shift, (dxk, dyk), relative to the reference image by minimizing the NMSEk may be made. This process is now repeated over all the sub regions (k=1:nsr) resulting in displacements (step 1004.2, FIG. 1).

Compute Offset of Target from Reference Image (FIG. 1, Step 1005)

Figure 3:
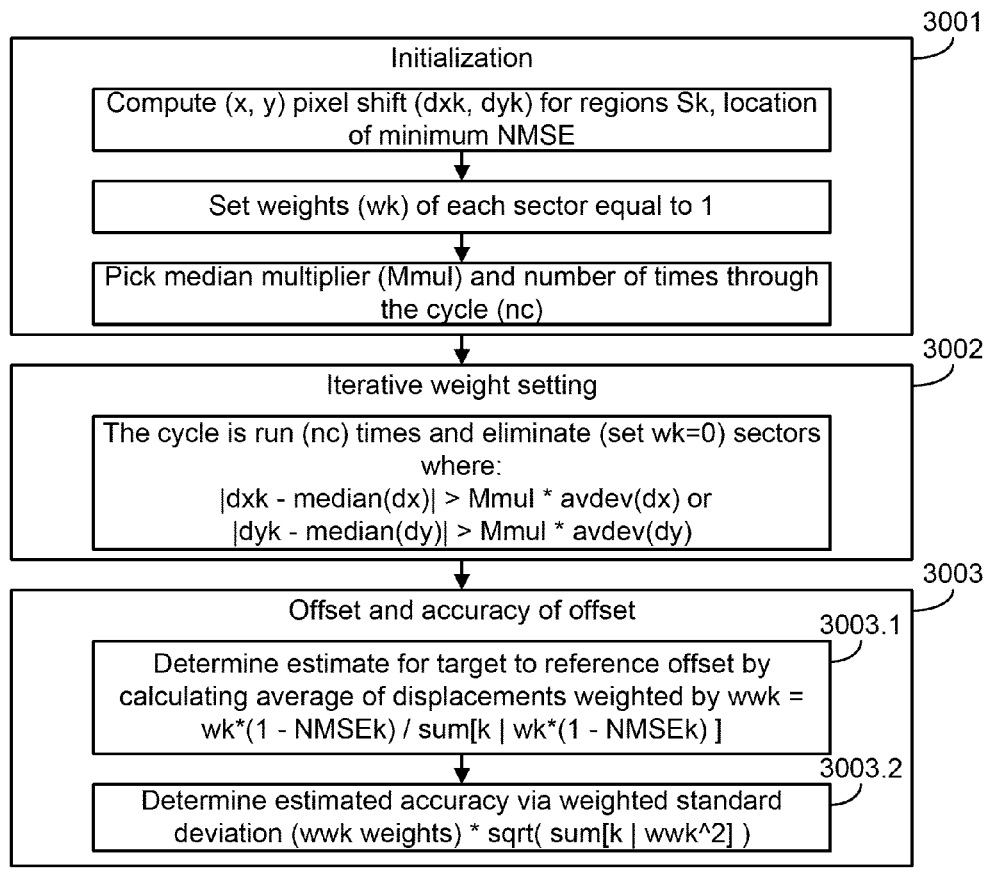
FIG. 3 is a flow diagram of a method of determining a target image offset relative to a reference image, according to one embodiment.
Figure 4:
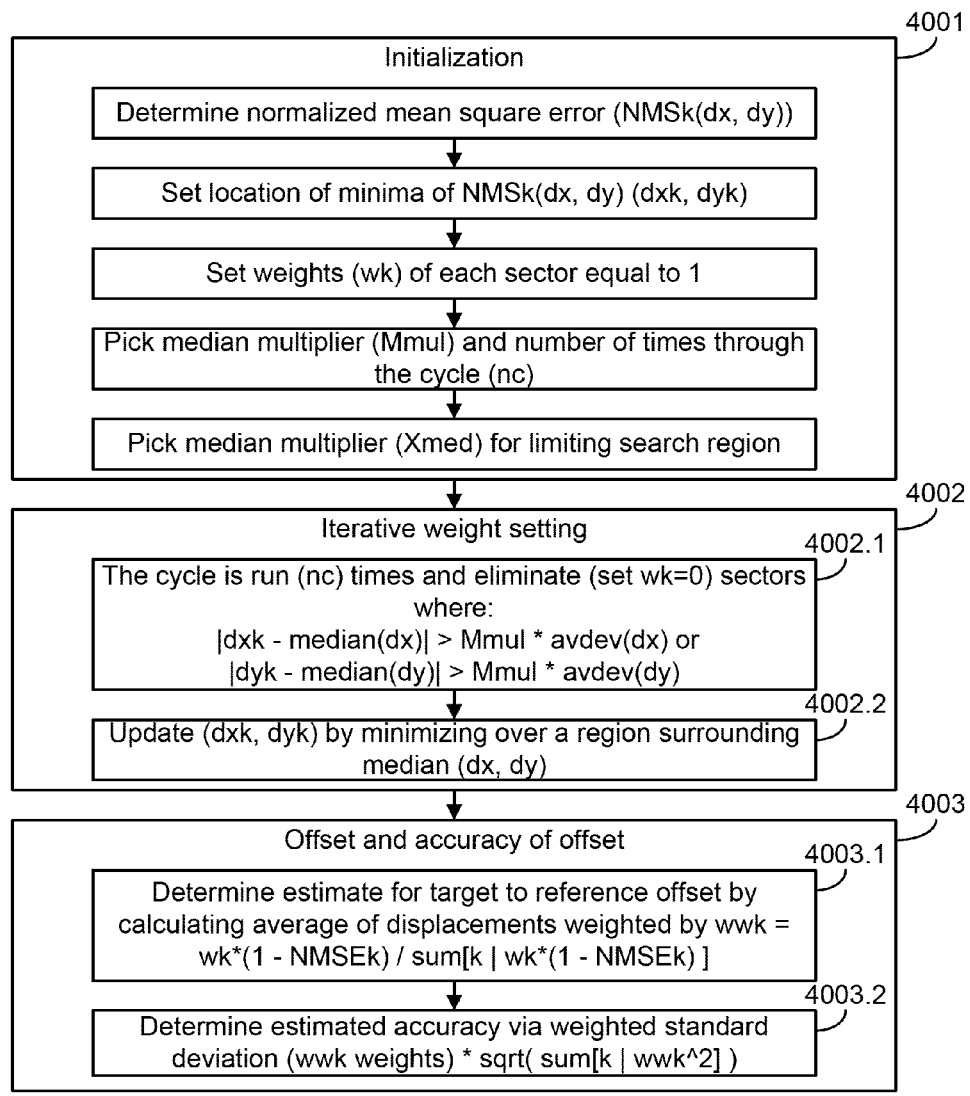
FIG. 4 is a flow diagram of a method of determining a target image offset relative to a reference image, according to another embodiment.

So far, the aforementioned has discussed the determination of offsets, (dxk,dyk), of individual regions. FIG. 3 illustrates one method for analyzing them to produce a single offset representative of displacement of the entire target image from the it's nominal location on the reference image. It utilizes the collection of computed sub region offsets (dxk, dyk) and cycles through them successively, tossing out 'outliers' with each cycle. The final answer is a weighted sum (3003.1) whose accuracy may be estimated (3003.2). FIG. 4 illustrates an alternative process wherein the optimal offset within each sub region is restricted to lie within some neighborhood of the median offset (4002.2), the rest of the process being similar to FIG. 3. The final result of all this is an estimate of the model mapping parameters (in this case translation) and an estimate of their uncertainty (FIG. 10).

FIG. 5 shows an example of the method of this disclosure applied to a SAR image (target image, 5001, as acquired by aerial platform, satellite or other image-acquisition device 5004); the corresponding optical reference image (5002) was oversized (linear dimension) by 200%-300% (Δ~0.8 km) and the resulting offset determination correctly identifies the sub section 5003 of reference image 5002 as the location of target SAR image 5001. FIG. 6 shows another example, this time the reference image is oversized some 400%~800% (Δ~1.6 km) and the process of FIG. 1 again correctly locates the SAR image within the much larger optical image. Further indications of the robustness of this technique come from simulations utilizing greater than 100 SAR target images taken over varying terrain. From the nominal position of the target image, a corresponding, oversized optical image was procured from a completely distinct database (the optical images were not taken by the SAR acquiring platforms) and oversized in all directions by a supposed uncertainty in target image position, Δ. The target images had total areas in the range ~0.5-1.5 km^2 and at the indicated Δ's (table 1), the total search areas were approximately 300% to 1100% of the target image area. All of these calculations were done with g(x), f1(x), f2(x)=x, 1, x. Table 1 summarizes the result of these calculations and shows high reliability target image location and image rejection (approximately 6% of images exhibited excessive SAR shadowing).

TABLE 1

|  | Δ = 0.35 km | Δ = 0.80 km |
| --- | --- | --- |
| Correctly located or image rejected | 97.3% | 91.4% |
| Incorrect location | 2.7% | 8.6% |

Because the SAR images had various pixel sizes (less than approximately 0.5 m-2.5 m) the uncertainty, Δ, when measured in pixels was in the range 120-700+ pixels (Δ=0.35 km) and 300 to 1600+ pixels (Δ=0.8 km). The offsets in these images are relatively large (10-100+ x) compared to other studies and the results are unexpectedly good compared to the state of the art, where it is suggested that area based matching methods (the current technique would be classified as such) are likely generally incapable of multimodal matching. The difficulty of matching the red/blue channel as extracted from a single photo is presented. So the present disclosure is a leap far beyond these stated limitations of the present art.

On the computational load of this process, at large Δ's (Δ/wxt>~0.2), subdividing the target and computing regional offsets, (dxk, dyk), requires considerably more (10 to almost 100 times depending on Δ) computation than a single sub region (nsr=1) strategy, however this strategy (single sub region) produces extremely poor results (less than a few percentage of cases resulting in correct offsets). At smaller displacements (Δ/wxt<~1/100) where there are numerous computational techniques (vide supra) the present method ranges from faster to ~10% slower. Thus the present method provides a very robust means at all displacements, Δ, without any speed sacrifices at small Δ.

Second Embodiment

Recover Affine Transformation

Figure 7:
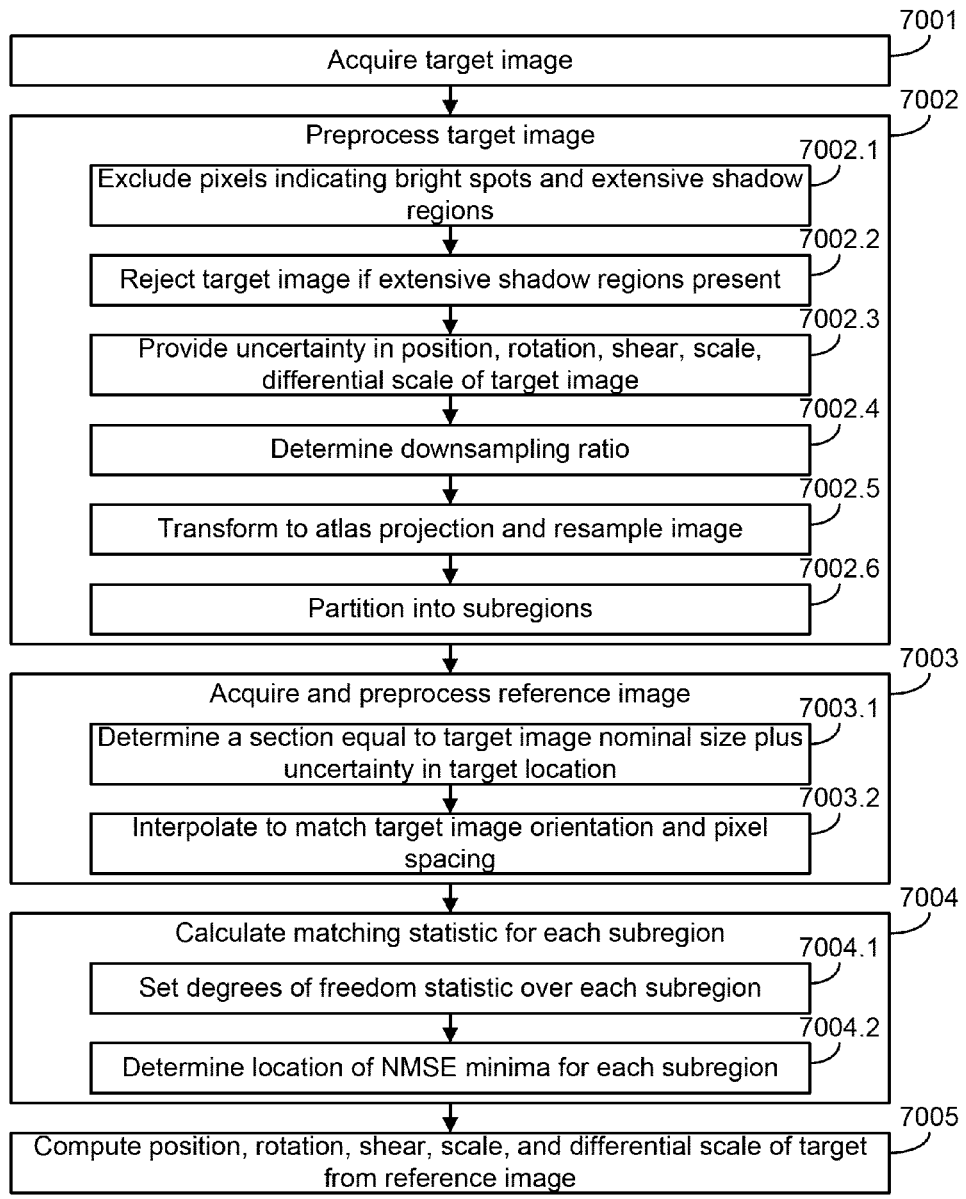
FIG. 7 is a flow diagram of a method of determining an affine transform relating a target image to a reference image, according to one embodiment.

FIG. 7 outlines the steps of this second embodiment which computes the affine transform relating a target image to a reference image. An affine transform is just the shift, rotation, shear, scale, and differential scale relating the target and reference image. Mathematically, the affine transform may be represented as follows:

$$ixr=ixt+dx+a*ixt+b*iyt \quad \text{(eq. 13)}$$

$$iyr=iyt+dy+c*ixt+d*iyt \quad \text{(eq. 14)}$$

where:
(ixr,iyr)/(ixt,iyt)=pixel location in reference/target image,
(dx,dy)=unknown translational offset between reference and target images, and
(a,b,c,d)=unknown coefficients determining rotation, shear, scale and differential scale differences between reference and target images.

Differences with first embodiment described above first occur at step 7002.3 where now in addition to providing the uncertainty in shift, (dx, dy), (called Δ previously), uncertainties in rotation, rotation, shear, scale, and differential scale or equivalently uncertainties in a, b, c, d as used in eqs. 13 & 14 are also provided. Later (7002.6), and this step is common with the first embodiment, the partitioning into sub regions, Sk, is required not only because of the different imaging modes of the target and reference images, but especially to allow for the migration of the Sk to their correct locations within the reference images (7004.2 & 7005) that is necessary when distortions such as scale error are considered.

The next difference with the first embodiment is the computation of the overall translation, rotation, etc. (process 7005). In situations where the effective uncertainties in a, b, c, d are much less than 1 (δa, δb, δc, δd<~0.1) either of the methods presented in FIG. 3 or 4 may be used as they stand, except for the last step (3003/4003). With the adjusted weights (wwk, normalized to $\Sigma_k$ wwk=1), and sub region offsets (dxk, dyk), a least squares minimization is done of:

$$E = \Sigma_k wwk^*(dxk - dx - a^*<ixt>_k - b^*<iyt>_k)^2 + wwk^* (dyk - dy - c^*<ixt>_k - d^*<iyt>_k)^2 \quad (eq.\ 15)$$

for the unknown translation (dx, dy) and a, b, c, d. Here, $<ixt>_k$, $<iyt>_k$ are the centers of mass of region Sk which is just the pixel location (ixt,iyt) weighted by the on off array for the target image, iont(ixt,iyt). The accuracy of this determination (of dx, dy, a, b, c, d) may also be estimated using the appropriate generalization of the formula in 3003.2 and 4003.2. By an appropriate generalization, if instead of the affine transformation of equations 13 & 14, an alternative model mapping is:

$$ixr = a0 + a1^*P1(ixt,iyt) + a2^*P2(ixt,iyt) + \ldots aM^*PM(ixt,iyt) \quad (eq.\ 15.1)$$

$$iyr = b0 + b1^*Q1(ixt,iyt) + b2^*Q2(ixt,iyt) + \ldots bM^*QM(ixt,iyt) \quad (eq.\ 15.2)$$

with known functions P1, P2 ... QM and unknown parameters a0, a1, ... bM. Procession may be as above with the only change taking place at step 7005 where eq. 15 and the estimation of uncertainty in a0, a1, ... bM is replaced by the appropriate (known) generalization. For relations which are not linear in the unknowns such as the generalized perspective projection model (an alternative model mapping):

$$ixr = (a + b^*ixt + c^*iyt)/(1 + d^*ixt + e^*iyt) \quad (eq.\ 15.3)$$

$$iyr = (a' + b'^*ixt + c'^*iyt)/(1 + d'^*ixt + e'^*iyt) \quad (eq.\ 15.4)$$

Procession may be as in FIG. 7, only now at step 7005, the analogue of E (eq. 15) is formulated and minimized using some suitable, non-linear least squares technique. From the result, a direct estimate of the error in model mapping parameters a, b, ... e' is made.

Further Embodiment

Shadow Inclusive

Figure 8:
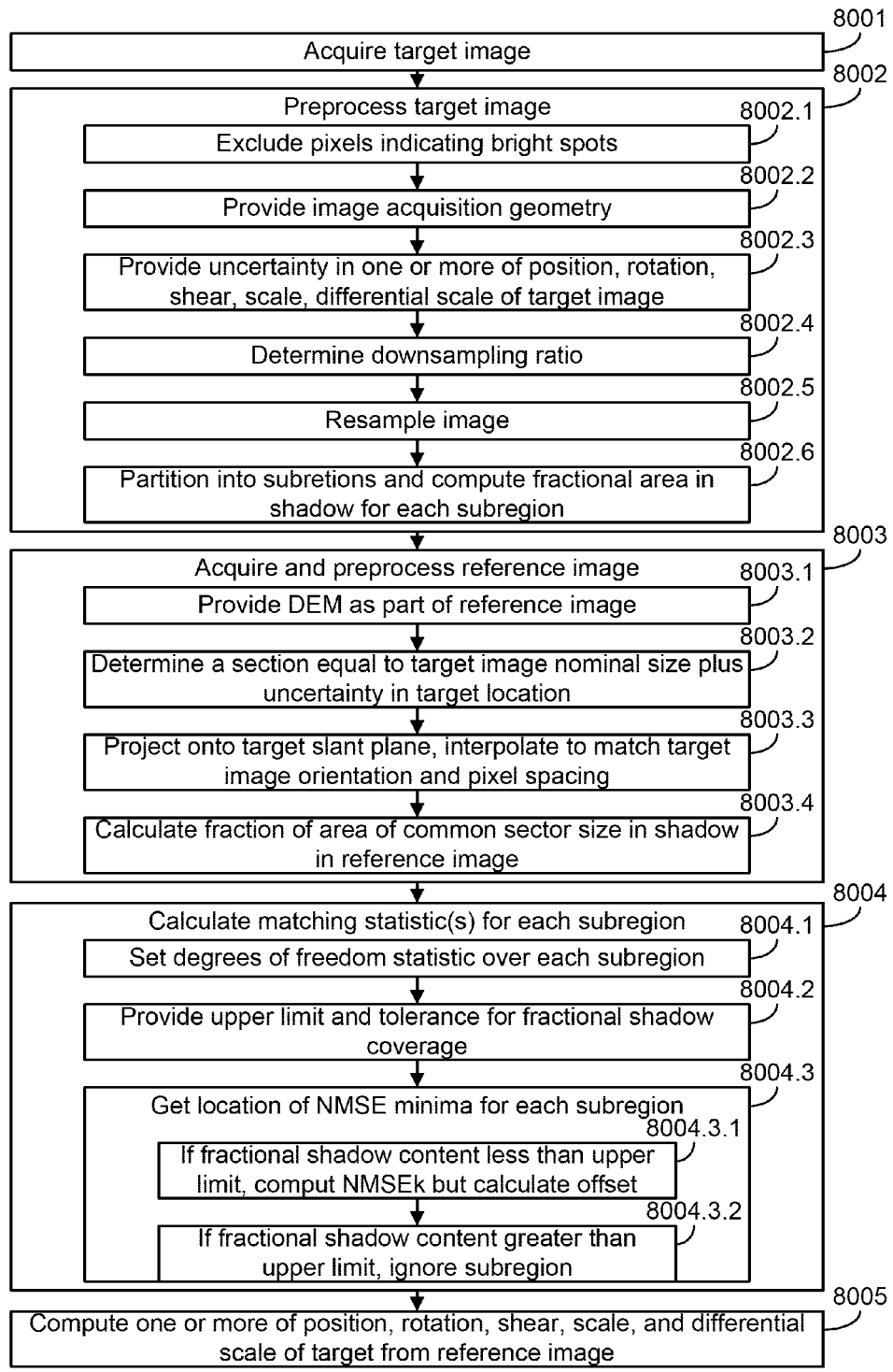
FIG. 8 is a flow diagram of a method of mapping a target image to a reference image including a shadow area, according to one embodiment.

The embodiment of FIG. 8 includes the shadow regions previously excluded in for example FIG. 1. It is most applicable in terrain with convoluted orography (e.g. canyons, ravines, mountains) but also functions in moderate terrain. The step of acquiring the target image (8001) is the same as previously described. Next, in preprocessing the target image (8002.1), the shadow array, isht, is constructed as before and on/off array of target points, iont, as before only they are not combined (step of iont(ic,ir)->iont(ic,ir) *isht(ic,it) is not carried out). The target acquisition geometry is provided (8002.2) which for SAR images typically takes the form of a nominal platform and image center specified in geographic (latitude, longitude, height above ellipsoid) coordinates and platform heading (direction of travel in geographic coordinates). Uncertainty in one or more of dx, dy, a, b, c, d (eqs. 13, 14) is provided (8002.3) and used to determine the extent of the reference image and possibly a target image down sampling ratio (8002.4). Only those amongst dx, . . . d with provided uncertainties are subsequently determined. The target image is then resampled (interpolated), but is not transformed to the atlas projection (as previously); in the case of SAR imagery, the image remains in the slant plane. The resulting down sampled image is then divided into sub regions, Sk, and from the (resampled) shadow array (isht) the fraction of the sub region shadowed (fTk) is computed and saved (8002.6).

Next, acquisition and preprocessing of the reference image (8003) is done, but in this instance, a digital elevation model (DEM) is part of the acquired image (8003.1). It is typically on a different (coarser) grid spacing (⅓, 1, 2 arc second or 10, 31, 62 m) than the reference image and this is advantageous since we would typically have to locally average (in the ground plane) a DEM at finer (<10 m) resolution to minimize ground clutter effects creating excess noise in the subsequent shadow projected map. At this point, acquisition of a DEM and a regular 2 dimensional reference image (typically on different grids) is done encompassing the extent of the target image and uncertainties in location/orientation (8003.2). Next, the 2-d ref image is projected, oriented, and interpolated onto the slant plane of the target image, while the DEM is utilized to create a shadow array (ishr(ixr,iyr)) for the projected reference image. The slant plane is determined from the image acquisition geometry provided in 8002.2. If there is a common or most common sub region, Sk, size, it's fractional area is computed and saved within shadow as a function of displacement (dx,dy) from the center of the reference image (result=fR(dx,dy)). This is simply the normalized moving average of the common sub region size (an nx×ny array of 1's for a rectangular sub region) with the shadow array ishr.

Next, the matching statistics for each sub region are computed (8004). As in processes 1004.1 & 7004.1, a fixed transformation of the reference image (|Ar|->g(|Ar|), typically with g(x)=x) and a variable transform for the target image (|At|->C1*f1(|At|)+ . . . Cn*fn(|At|), vide supra) is specified (n, f1,f2,f3=3,1, x, x^2 for example). Subsequently, the fractional shadow areas are utilized as an additional discriminator for matching (dxk, dyk determination) and for this purpose, specification of a tolerance, dfR, is needed for deciding whether or not the fractional shadow (fTk) in target sub region Sk, and the fractional shadow for a proposed placement on the reference image fRk(dx,dy), is close enough to be credible. Further, the parameter, fRu, specifies an upper limit for shadow coverage above which the region Sk is removed from consideration. Examples of these parameters may include, but are not limited to, dfR/fRu=10%/60%.

Subsequently, process 8004.3 includes computing the offset of region Sk, (dxk, dyk), and possibly the NMSEk (dx,dy) based on the shadow content, fTk, of Sk (8004.3.1-8004.3.2). Thus, in 8004.3.1, when fTk<fRu, NMSEk(dx, dy) is computed as outlined in equations 1-12, but the following is also computed and saved:

$$fRk(dx,dy) = \Sigma_k ishr(ixt+dx,iyt+dy)/mk \quad (eq.\ 16)$$

where $\Sigma_k$ represents, as previously, the summation over all points ixt, iyt within target region Sk and mk is the total number of points irrespective of whether they are located in the shadow or not and whether they are on/off. In determining the minimum of NMSEk(dx,dy) only points (dx,dy) where fRk(dx,dy) is within the bounds:

$$fTk-DfR<fRk(dx,dy)<fTk+DfR \qquad (eq. 17)$$

are considered as candidates for dxk,dyk. In the case of very high shadow content (fTk>=fRu), typically, NMSEk(dx,dy) is not computed and the region is excluded from further consideration.

For the final step, 8005, as in FIG. 3 or FIG. 4 the required parameters are computed, except now the only offsets (dx, dy) that form acceptable candidates must possess the same shadowing fractions (within the prescribed limits) as present in the target regions. Said differently, in certain embodiments, the acceptable offsets (dxk, dyk) must also satisfy the constraint of equation 17. At the conclusion of this step, an estimate of one or more of the parameters of position, rotation, shear, scale, differential scale as well as their uncertainty is obtained.

Further Embodiment

Shadow Matched

Figure 9:
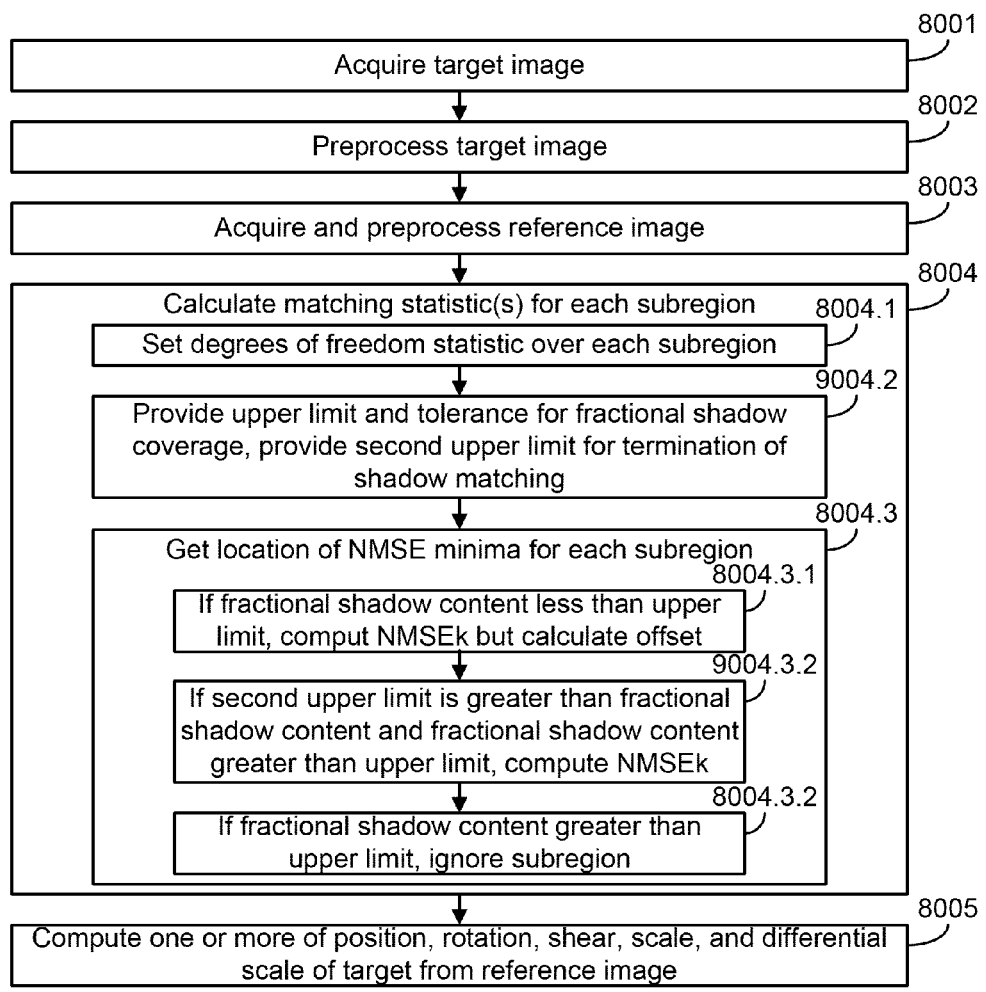
FIG. 9 is a flow diagram of a method of mapping a target image to a reference image using a shadow area, according to one embodiment.

The embodiment of FIG. 9 extends the previous embodiment (shadow inclusive) to cover situations with greater shadow content. The procedure is identical to the shadow inclusive embodiment up to step 9004.2. Here and before, fRu and tolerance dfR denotes the upper limit to some shadow content and the tolerance for fractional shadow area matching. New parameter fR2u denotes the upper limit beyond which we do not consider a sub region because of high shadow content. Now, since the method is including not only the area but the shape of the shadow regions in matching, the method may use dfR/fRu/fR2u=10%/50%/90%. So, when fTk<fRu (8004.3) or fTk>=fR2u (8004.3.2) the method proceeds as before but now in the intermediate case of fR2u>fTk>=fRu (9004.3.2) instead of utilizing the target and reference image amplitudes themselves, the method instead uses their shadow arrays (isht, ishr) to compute NMSEk(dx,dy).

Further Aspects of the Present Disclosure

SAR-to-optical is mainly discussed because of agreed upon difficulty in registering these specific and important imaging modalities. Applying alterations within the scope of this disclosure allows for image registration of other image types such as magnetic resonance computerized tomography (MR-CT or MRI or NMR) to magnetic positron emission tomography (MR-PET), X-ray to CATSCAN, infrared to optical, and others as well. Because of their speckle, sonograms or ultrasound images are very similar to SAR and the presented disclosure would be well suited to matching them with other (especially non speckled) imagery like X-ray. Also, presented techniques can be used within a single image modality (SAR to SAR, optical to optical) as well. Thus, the reference and target images describe herein may include, but are not limited to, a synthetic aperture radar (SAR) image, an optical image, an infrared image, a millimeter image, an ultrasonic image, a magnetic resonance imaging (MRI) image, and an x-ray image.

The convolutions required (esp. step 1004 and related) may be sped up by using field programmable gate arrays to compute the required fast Fourier transforms and other steps. Also, because of the inherent independence of the sub region NMSEk(dx,dy) calculation, the present disclosure provides a method of directly parallelizing the computation by allocating only a portion of the sub regions to each of a number of processing nodes (autonomous PC's in the simplest implementation).

In another use of this method, because of the reliability of image location, it could be applied to images taken at relatively long times (approximately greater than months to years) apart and used to directly look at shifts in geophysical features such as could result from seismic fault movement, subsidence due to geothermal plants or some types of natural gas production (fracking).

While various embodiments discussed above are presented under separate headings, it should be understood that various features described with respect to one embodiment may be applied in the context of another embodiment. All combinations of features described with respect to the various embodiments presented herein are contemplated within the scope of the present disclosure.

It should be noted that the example processes shown herein are for example purposes only such that other processes may be used which fall within the spirit and scope of the present disclosure. As such, it should also be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code (i.e., computer readable medium). Accordingly, implementation may be with the processor(s)/processing circuit described above via, for example, one or more memory devices communicably coupled to the processor(s)/processing circuit.

The computer (also referred to herein as machine readable) readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed:

1. A non-transitory computer-readable storage medium having instructions stored therein, the instructions executable by a processor to cause the processor to perform operations comprising:
   receiving a plurality of target images;
   receiving a reference image that overlaps the plurality of target images;
   preprocessing the plurality of target images, wherein the preprocessing includes:
      rejecting one or more first target images of the plurality of target images with a shadow region above a shadow threshold while keeping one or more second target images of the plurality of target images with a shadow region below the shadow threshold;
      for each second target image:
         transforming the second target image into an atlas projection to match the reference image; and
         partitioning the transformed target image into a plurality of sub-regions;
   determining a matching statistic for each sub-region to determine a location for each sub-region relative to a corresponding portion of the reference image; and
   determining an alignment of each sub-region with the corresponding portion of the reference image based on the determined matching statistic for each sub-region.

2. The non-transitory computer readable storage medium of claim 1, further comprising determining an offset of the second target image relative to the reference image and an associated uncertainty for the determined offset.

3. The non-transitory computer readable storage medium of claim 1, further comprising:
   determining an uncertainty for the reference image; and
   interpolating the reference image to match the second target image orientation and pixel spacing based on the determined uncertainty for the reference image.

4. The non-transitory computer readable storage medium of claim 1, wherein determining the matching statistic for each sub-region includes:
   selecting one or more basis functions to map a target image amplitude for the sub-region to an amplitude of the reference image.

5. The non-transitory computer readable storage medium of claim 1, further comprising:
   providing a model for mapping between the second target image and the reference image; and
   determining an uncertainty in a parameter of the model used for mapping.

6. The non-transitory computer readable storage medium of claim 1, wherein the target image includes one of a synthetic aperture radar (SAR) image, an optical image, an infrared image, a millimeter image, an ultrasonic image, a magnetic resonance imaging (MRI) image, or an x-ray image.

7. The non-transitory computer readable storage medium of claim 1, wherein the reference image includes one of a SAR image, an optical image, an infrared image, a millimeter image, an ultrasonic image, a MRI image, or an X-Ray image.

8. An image processing system, comprising:
an image acquisition device configured to acquire a plurality of target images and a reference image; and
a processor structured to pre-process the plurality of target images, wherein the pre-processing of the target image includes:
receiving the plurality of target images;
rejecting one or more first target images with a shadow region above a shadow threshold while keeping one or more second target images with a shadow region below the shadow threshold to create a kept target image;
providing a model for mapping between the kept target image and the reference image;
transforming the kept target image into an atlas projection to match the reference image;
partitioning the transformed target image into sub-regions; and
determining a fractional area of each sub-region that is shadowed;
wherein the processor is structured to pre-process the reference image, wherein the pre-processing of the reference image includes:
receiving the reference image;
providing a digital elevation map (DEM) of the reference image;
projecting the reference image onto a target slant plane, wherein the projection includes a shadow region; and
interpolating the projected reference image to match orientation and pixel spacing of the kept target image;
wherein the processor is structured to determine a matching statistic for each target image sub-region to determine a location and an alignment for each sub-region relative to a corresponding portion of the received reference image.

9. The image processing system of claim 8, wherein the processor is further structured to determine a shadow area for the received reference image.

10. The image processing system of claim 9, wherein the processor is structured to:
select one or more basis functions to map a target image amplitude for each sub-region to an amplitude of the reference image.

11. The image processing system of claim 8, wherein the matching statistic is based on a shadow content of the target image sub-region matching a shadow content of the corresponding portion of the received reference image within a specified tolerance.

12. The image processing system of claim 8, wherein the processor is further structured to determine a model parameter for mapping between the kept target image and the received reference image and to determine an uncertainty with the model parameter.

13. The image processing system of claim 8, wherein the processor is structured to determine a down sampling ratio for the kept target image.

14. The image processing system of claim 8, wherein the received target image includes one of a synthetic aperture radar (SAR) image, an optical image, an infrared image, a millimeter image, an ultrasonic image, a magnetic resonance imaging (MRI) image, or an x-ray image.

15. A method of mapping a synthetic aperture radar (SAR) image to a reference image, the method comprising:
pre-processing, by a processor, a plurality of target images including:
rejecting one or more first target images with a shadow region above a shadow threshold while keeping one or more second target images with a shadow region below the shadow threshold to create a kept target image;
partitioning the kept target image into a plurality of sub-regions; and
determining a fractional area of each of the plurality of kept target sub-regions that is shadowed;
pre-processing, by the processor, the reference image including:
projecting the reference image onto a target slant plane, wherein the projection includes a shadow region; and
determining a fraction area of the projected reference image that is shadowed;
determining, by the processor, a matching statistic for each sub-region that includes:
selecting one or more basis functions to map a target image amplitude for each sub-region to a reference image amplitude;
providing an upper limit and tolerance for fractional coverage, and providing an upper limit beyond which the sub-region is not considered due to having an excessive shadow region; and
determining a location and a normalized mean square error (NMSE) for each considered sub-region based on the matching statistic for each considered sub-region;
wherein the determined location of the sub-region corresponds with a shadow content of the sub-region matching a shadow content of the projected reference image within a specified tolerance.

16. The method of claim 15, wherein pre-processing of the kept target image further includes excluding a pixel from the target image based on the pixel representing a bright spot in the target image.

17. The method of claim 15, wherein a target image with an excessive shadow region is a target image that has a greater than or equal to fifty-percent contiguous SAR shadow.

18. The method of claim 15, further comprising determining a model parameter for an offset of the kept target image relative to the projected reference image and an uncertainty in the model parameter.

19. The method of claim 15, wherein the target image includes one of a synthetic aperture radar (SAR) image, an optical image, an infrared image, a millimeter image, an ultrasonic image, a magnetic resonance imaging (MRI) image, or an x-ray image.

* * * * *